(12) United States Patent
Arakane

(10) Patent No.: US 6,499,645 B2
(45) Date of Patent: Dec. 31, 2002

(54) AUTOMATIC SOLDERING APPARATUS

(75) Inventor: Hideyuki Arakane, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/966,980

(22) Filed: Sep. 28, 2001

(65) Prior Publication Data

US 2002/0066766 A1 Jun. 6, 2002

(30) Foreign Application Priority Data

Oct. 5, 2000 (JP) .......................................... 2000-306109

(51) Int. Cl.⁷ ................................................. B23K 1/08
(52) U.S. Cl. .......................................... 228/36; 228/37
(58) Field of Search ................................. 228/256, 260, 228/37, 33, 36

(56) References Cited

U.S. PATENT DOCUMENTS 4,717,064 A    1/1988  Popielarski et al.

FOREIGN PATENT DOCUMENTS

| DE | 4136786 | 5/1993 | |
|---|---|---|---|
| EP | 0140997 | 5/1985 | |
| SU | 1073022 | 2/1984 | |
| SU | 1087280 | 4/1984 | |
| SU | 1222452 A | * | 4/1986 |
| SU | 1323279 | 7/1987 | |

* cited by examiner

Primary Examiner—M. Alexandra Elve
Assistant Examiner—Len Tran
(74) Attorney, Agent, or Firm—Sonnenschen, Nath & Rosenthal

(57) ABSTRACT

An automatic soldering apparatus comprises a solder bath, and a plurality of component parts such as a jet flow nozzle, bolts, nuts and washers equipped in the solder bath, wherein a relative density of such component parts equipped in the solder bath of the automatic soldering apparatus is smaller than that of lead-free solder to be used in the automatic soldering apparatus. Preferably each piece of the component parts are made of titanium material or ceramic material having relative density of around 4.5. Further the lead-free solder includes 2.5 weight % of silver, 0.5 weight % of cupper, 1.0 weight % of bismuth, and tin for the rest, and having a relative density of around 7.5. Accordingly, in case of dropping the piece of components parts into the melting solder, the dropped piece can float on the melting solder without breaking the apparatus.

8 Claims, 1 Drawing Sheet

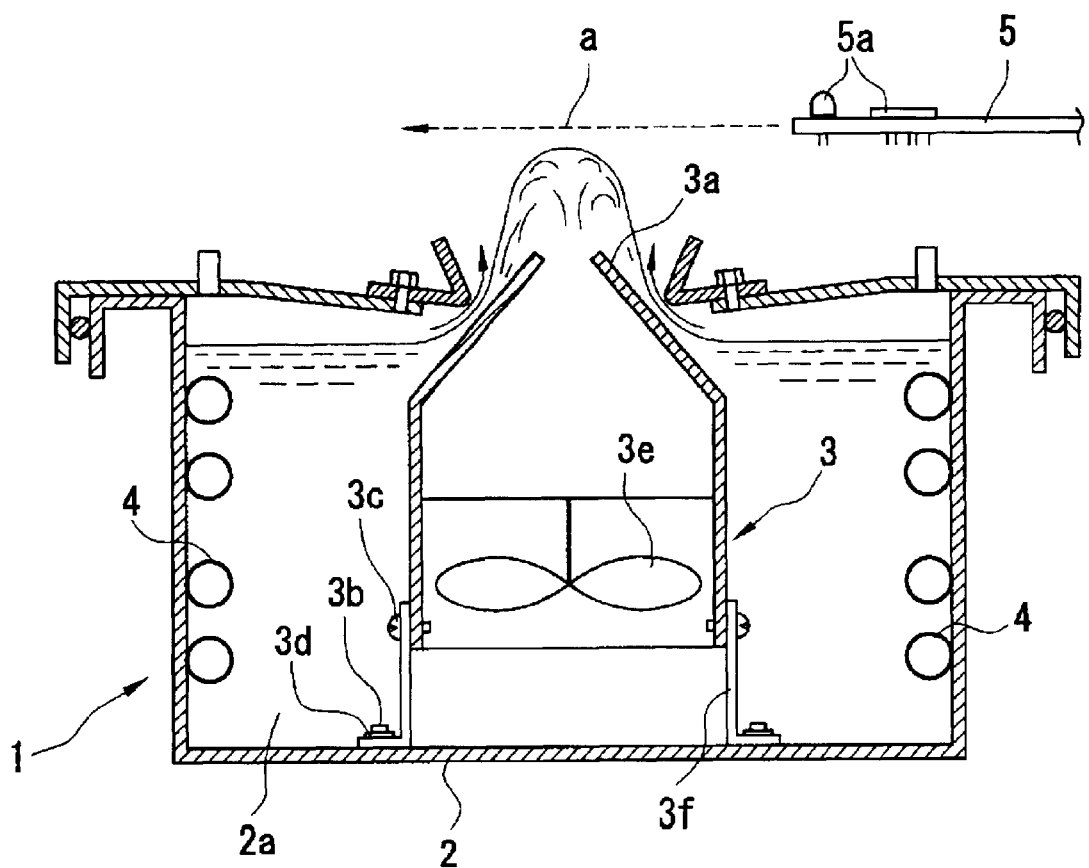

AUTOMATIC SOLDERING APPARATUS

RELATED APPLICATION DATA

The present application claims priority to Japanese Application(s) No(s). P2000-306109 filed Oct. 5, 2000, which application(s) is/are incorporated herein by reference to the extent permitted by law.

BACKGROUND OF THE INVENTION

1. Field of the Invention

This invention relates to a jet flow type automatic soldering apparatus utilizing a lead-free solder for mounting a plurality of electronic parts on a printed circuit board.

2. Description of the Related Art

Conventionally in a jet flow type automatic soldering apparatus, it is common that component parts equipped in a solder bath are made from stainless steel and a Sn (Tin)—Pb (Lead) based eutectic solder is employed as a melting solder. A relative density of no such Sn—Pb based eutectic solder is about 8.4 (in the case of Tin(Sn): 63% , Lead(Pb) : 37%), and this type of Sn—Pb based eutectic solder is suitable for mounting various electronic parts on a printed circuit board because of its superior characteristics such as temperature characteristic, soldering characteristic besides its reliability as a material.

However, the above-mentioned Sn—Pb based eutectic solder includes lead (Pb) material. In view of the world wide environmental protection, the regulation of using such lead material has been reinforcing and it becomes common to use a lead-free solder in this field. Suppose the components of the lead-free solder are 2.5 weight % of silver, 0.5 weight % of cupper, 1.0 weight % of bismuth, and the rest is tin, and in this case, a relative density of such lead-free solder becomes about 7.5.

When a conventional automatic soldering apparatus employs such lead-free solder for the sake of the environmental protection, the component parts made of stainless steel such as a nozzle plate for a jet flow solder and fastening parts such as bolts, nuts and washers for fastening the nozzle plate to a predetermined position in the solder bath are used. In this case, a relative density of these component parts, namely the relative density of the stainless steel, is about 7.9 and this is larger than the relative density of the lead-free solder, namely about 7.5 as mentioned above. Accordingly, when some pieces of the component parts are removed by chance and dropped off from the equipped positions, they would sink into a bottom of the solder bath.

As described above, when the pieces of component parts equipped in the solder bath sink into the bottom of the solder bath, it becomes very difficult to discover and to pick up these dropped component parts, and further these dropped small component parts such as bolts, nuts and washers might be swallowed in the a jet flow pump provided for generating jet stream of the melting solder. These swallowed component parts might induce the breakage of the jet flow pump and the damage of equipment of the drive section in the automatic soldering apparatus.

Accordingly, in case of using the lead-free solder in accordance with the environmental protection, there remains many problems to clear such as sinking of dropped off component parts into the bottom of the solder bath, difficulty of early detection of the dropped component parts and the breakage or damage by such dropped off component parts.

SUMMARY OF THE INVENTION

In order to overcome above mentioned problem, this invention presents an automatic soldering apparatus characterized wherein, any of the component parts equipped in the solder bath are made from material having a relative density smaller than a relative density of a lead-free solder employed in the solder bath of the automatic soldering apparatus.

According to the present invention, the component parts equipped in the solder bath include a part or all of a jet nozzle, fastening parts for the jet nozzle, adjusting component parts or the like.

In accordance with the automatic soldering apparatus of this invention, the component parts equipped in the solder bath such as a nozzle plate for jet flow solder and fastening parts such as bolt, nut and washer for fastening the nozzle plate to a predetermined position in the solder bath are made from material having a relative density smaller than the relative density of the lead-free solder. Accordingly, in case where some pieces of the component parts are dropped off in the solder bath, such dropped off component parts can be floated on the surface of the melting lead-free solder due to the relative density difference of the component parts and the lead-free solder.

Thereby, it is prevented to take long time to find out the dropped off component parts and the damage of the equipment can be avoided and it becomes easy to discover and to recover such dropped off component parts.

BRIEF DESCRIPTION OF THE DRAWING

FIGURE is a sectional view of one example of an automatic soldering apparatus according to the present invention.

DETAILED DESCRIPTION OF THE PREFERRED EMBODIMENT

Next a suitable form of an automatic soldering apparatus of the present invention is explained with reference to the accompanying drawing. An automatic soldering apparatus 1 as shown in the FIGURE is a jet flow type automatic soldering apparatus and in a solder bath 2 of the automatic soldering apparatus 1, various component parts 3 are provided. Each of the component parts 3 is preferably made of titanium or ceramic in accordance with the present invention. Thereby, the relative density of the each of the component parts 3 becomes around 4.5.

The above-mentioned component parts 3 are, practically as shown in the figure, a nozzle 3a for a jet flow and fastening parts such as bolts 3b, nuts 3c, washers 3d and supporting feet 3f for fastening the nozzle 3a to a predetermined position of the solder bath 2. The components of the lead-free melting solder 2a employed in this solder bath 2 are 2.5 weight % of silver, 0.5 weight % of cupper, 1.0 weight % of bismuth, and the rest is tin, and the relative density of the lead-free solder becomes about 7.5 in this case.

In case of automatically soldering various electronic parts 5a mounted on a printed circuit board 5 using thus constructed automatic soldering apparatus 1, the lead-free solder 2a stored in the solder bath 2 is heated up to a predetermined temperature by a heater 4 to melt the lead-free solder 2a and is kept the melting condition, then thus the melting lead-free solder 2a is flowed out from a nozzle exit of the nozzle 3a as to form a small raised portion as shown in the figure by rotating blades 3e of the jet pump by a drive motor (not shown).

Then as shown in an arrow a in the FIGURE, the above mentioned printed circuit board 5 carrying the electronic parts 6a is moved at a predetermined speed as for the back side of the printed circuit board 5 to contact with a tip of the small raised portion formed by the jet flow of the melting lead-free solder 2a, thereby the automatic soldering is conducted.

In such soldering process, mechanical vibrations of a drive motor or the like are given to the solder bath 2 from outside, and in this case, the component parts 3 such as bolts 3b and washers 3d equipped in the solder bath 2 become loose and drop out in the solder bath 2, and further even the nozzle 3a might drop in the solder bath 2. Some times, an operator may carelessly drop one of the component parts 3 such as bolts in the solder bath 2.

However each of the component parts 3 is made from material (such as titanium or ceramic) having its relative density of around 4.5, the melting solder 2a using a lead-free solder has its relative density of around 7.5, so that any of dropped component parts can be floated on the surface of the melting lead-free solder 2a due to the difference of relative density between the component parts and the lead-free solder 2a.

As thus described, the removed, dropped off or carelessly dropped piece of component parts 3 is floating on the surface of the melting lead-free solder 2a, so that this piece of component parts can be easily discovered and recovered. Further such dropping off of the piece of component parts 3 is easily confirmed by watching the surface of the melting lead-free solder 2a, so that the breakage of the machine is always under watching state and it is possible to avoid the erroneous production of defectively mounted circuit board by the automatic soldering process, and further thus picked up component parts 3 can be used again to repair the automatic soldering machine.

Further the piece of dropped off component parts 3 does not sink into the bottom of the solder bath 2, so that the piece of dropped component parts 3 does not lost, and further such dropped off piece of component parts 3 is able to float on the lead-free solder 2a. Accordingly, the dropped piece of component parts 3 is never hit by the blade 3e of the jet flow type solder pump, so that the breakage of the equipments, the solder bath 2 for example, is protected thereby.

Accordingly in the automatic soldering apparatus of the present invention, the relative density of the component parts used in the inside of the solder bath is selected to be smaller than the relative density of the employed lead-free solder, so that many problems will be overcome by this.

What is claimed is:

1. An automatic soldering apparatus comprising:
   a solder bath for storing lead-free solder; and
   plural pieces of component parts equipped in said solder bath, wherein
      a relative density of at least a part of said component parts is lighter than that of said lead-free solder, wherein
      said component parts are fastening parts including bolts, nuts, and washers.

2. The automatic soldering apparatus as claimed in claim 1, further comprising:
   a nozzle plate in said solder bath, wherein
   said fastening parts are used to fasten said nozzle plate to said solder bath.

3. An automatic soldering apparatus comprising:
   a solder bath for storing lead-free solder;
   a nozzle plate; and
   fastening parts for fastening said nozzle plate to said solder bath, wherein
      material of said fastening parts are selected from material having a relative density lighter than that of said lead-free solder, wherein
      said pieces of component parts include a nozzle plate and a plurality of fastening parts including bolts, nuts, and washers.

4. The automatic soldering apparatus as claimed in claim 3, wherein
   each of said component parts are made from ceramic material.

5. The automatic soldering apparatus as claimed in claim 3, wherein
   each of said component parts are made from titanium material.

6. The automatic soldering apparatus as claimed in claim 1, wherein
   said lead-free solder includes 2.5 weight % of silver, 0.5 weight % of cupper, 1.0 weight % of bismuth, and tin for the rest.

7. The automatic soldering apparatus as claimed in claim 1, wherein
   said relative density of said component parts is around 4.5, while said relative density of the lead-free solder is around 7.5.

8. The automatic soldering apparatus as claimed in claim 7, wherein
   said lead-free solder includes 2.5 weight % of silver, 0.5 weight % of cupper, 1.0 weight % of bismuth, and tin for the rest.

* * * * *